United States Patent
Naganuma

[11] Patent Number: 6,076,382
[45] Date of Patent: Jun. 20, 2000

[54] STEERING LOCK DRIVE

[75] Inventor: Yasunori Naganuma, Miyazaki, Japan

[73] Assignee: Honda Lock Mfg. Co., Ltd., Miyazaki, Japan

[21] Appl. No.: 09/432,396

[22] Filed: Nov. 2, 1999

Related U.S. Application Data

[62] Division of application No. 09/048,089, Mar. 26, 1998, Pat. No. 5,974,841.

[30]     Foreign Application Priority Data

| Mar. 28, 1997 | [JP] | Japan | ................................. 9-77471 |
| Mar. 28, 1997 | [JP] | Japan | ................................. 9-77472 |
| Mar. 28, 1997 | [JP] | Japan | ................................. 9-77473 |

[51] Int. Cl.$^7$ .............................................. B60R 25/02
[52] U.S. Cl. ................................... 70/186; 70/252
[58] Field of Search ............................ 70/182–186, 252

[56]                References Cited

U.S. PATENT DOCUMENTS

| 1,076,835 | 10/1913 | Lyons | .................................. 70/182 |
| 1,244,893 | 10/1917 | Reed | ................................... 70/185 |
| 1,327,406 | 1/1920 | Racow | ................................... 70/185 |
| 2,155,063 | 4/1939 | Sandberg | ............................. 70/252 |
| 2,222,900 | 11/1940 | Fruus | ................................... 70/186 |
| 2,747,396 | 5/1956 | Gamby | .................................. 70/185 |
| 2,874,562 | 2/1959 | Cross | .................................... 70/185 |
| 3,261,187 | 7/1966 | Eishenauer | ........................ 70/186 X |
| 3,590,611 | 7/1971 | Nakashima | ........................... 70/186 |
| 3,791,182 | 2/1974 | Oxley et al. | ............................. 70/252 |
| 3,940,958 | 3/1976 | Kuroki | ................................. 70/186 |
| 4,333,325 | 6/1982 | Marikawa et al. | .................. 70/186 |
| 4,400,954 | 8/1983 | Nakamoto et al. | ................ 70/252 X |
| 4,433,562 | 2/1984 | Tsuchiya | ............................... 70/186 |
| 4,776,189 | 10/1988 | Weber et al. | ........................ 70/185 X |
| 5,974,841 | 11/1999 | Naganuma | ........................... 70/186 |

FOREIGN PATENT DOCUMENTS

| 1330951 | 5/1963 | France | .................................. 70/186 |
| 1925851 | 11/1969 | Germany | ............................. 70/252 |
| 1653973 | 11/1970 | Germany | ............................. 70/186 |
| 315310 | 2/1934 | Italy | ..................................... 70/186 |
| 412648 | 1/1946 | Italy | ..................................... 70/183 |
| 63-15080 | 4/1988 | Japan . | |
| 3-27891 | 6/1991 | Japan . | |
| 337444 | 10/1930 | United Kingdom | ................ 70/186 |

Primary Examiner—Lloyd A. Gall
Attorney, Agent, or Firm—Liniak, Berenato Longacre & White

[57]    ABSTRACT

A steering lock device including; a fixed housing, a cylinder body mounted to the housing, a rotor disposed in the cylinder body and made rotatable by an inserted key, a steering shaft having an engagement recess defined in a portion of a circumferential surface, a lock pin slidably supported in the housing and engageable at the top end with the engagement recess, and a look mechanism actuated in accordance with the rotation of the rotor to conduct engagement and release of engagement of the lock pin with and from the engagement recess, wherein the lock pin comprises an engagement pin section that slides being guided by a first slide hole in the housing and engageable at a top end with the engagement recess and a cam driven section that slides being guided by a second slide hole in the housing and actuated by an operation force of the lock mechanism by way of a cam, wherein the engagement pin section and the cam driven section are formed integrally by pressing into a plate-shaped member, and wherein burr escape portions are defined at corners of the first slide hole corresponding to burrs formed on the outer peripheral edge of the engagement pin section upon pressing such that the burrs may be located in the burr escape portions.

4 Claims, 9 Drawing Sheets

STEERING LOCK DRIVE

This is a divisional application of U.S. application Ser. No. 09/048,089 filed on Mar. 26, 1998, U.S. Pat. No. 5,974,844.

BACKGROUND OF THE INVENTION

1. Field of the Invention

The present invention relates to a steering lock device in which a rotor is made rotatable by insertion of a key and inserted into a fixed cylinder, a housing having a guide projection inserting into an insertion hole of a steering column pipe is mounted to the steering column pipe, and a lock mechanism having a lock pin in a square cross-sectional shape engageable with an engagement recess of a steering shaft is constituted to enable engagement and disengagement of the lock pin with and from the engagement recess to be switched in accordance with the rotation of the rotor.

2. Description of the Prior Art

The above steering lock device has already been known, for example, by Japanese Utility Model Publication Nos. 15080/1988 and 27891/1991.

Generally, the lock mechanism comprises a slider and a lock pin engaged therewith and is manufactured, for example, by cutting or like other machining operation, so that a relatively great number of parts to constitute the lock mechanism is necessary and assembling work of the mechanism is complete.

In addition, if the lock mechanism having a relatively great number of parts can be simplified and the number of parts can be reduced, the assembling operation for the lock mechanism can also be facilitated.

OBJECT OF THE INVENTION

An object of the present invention is to provide a steering lock device which can be constituted with a reduced number of parts and which is facilitated for assembling work.

A further object of the present invention is to provide a steering lock device which can he constituted with a reduced number of parts and which is facilitated for assembling work.

SUMMARY OF THE INVENTION

In accordance with a first aspect of the present invention, the foregoing object can be attained in a steering lock device including:

a fixed housing, a cylinder body mounted to the housing, a rotor disposed in the cylinder body are made rotatable by an inserted key, a steering shaft having an engagement recess defined in a portion of a circumferential surface, a lock pin slidably supported in the housing and engageable at the top end with the engagement recess, and a lock mechanism actuated in accordance with the rotation of the rotor to conduct engagement and release of engagement of the lock pin with and from the engagement recess, wherein the lock pin comprises an engagement pin section that slides being guided by a first slide hole in the housing and engageable at a top end with the engagement recess and a cam driven section that slides being guided by a second slide hole in the housing and actuated by an operation force of the locking mechanism by way of a cam, wherein the engagement pin section and the cam driven section are formed integrally by pressing into a plate-shaped member, and wherein burr shaped escape portions are defined at corners of the first slide hole corresponding to burrs formed on the outer peripheral edge of the engagement pin section upon pressing such that the burrs may be located in the burr escape portions.

In a preferred embodiment of the invention, the burr escape portions are formed at four corners of the first slide hole corresponding to the burrs.

In accordance with a second aspect of the present invention, the foregoing object can be attained in a steering lock device including:

a fixed housing, a cylinder body mounted to the housing, a rotor disposed in the cylinder body and made rotatable by an inserted key, a steering shaft having an engagement recess defined in a portion of a circumferential surface, a lock pin body slidably supported in the housing and engageable at the top end with the engagement recess, and a lock mechanism actuated in accordance with the rotation of the rotor to conduct engagement and release of engagement of the lock pin body with and from the engagement recess, wherein the lock pin body comprises a lock pin that slides being guided by a first slide hole in the housing and engageable at a top end with the engagement recess and a slider that slides being guided by a second slide hole in the housing and actuated by an operation force of the lock mechanism by way of a cam, wherein the lock pin is formed by pressing into a plate shaped member, and wherein burr escape portions are defined at corners of the first slide hole corresponding to burrs formed on the outer peripheral edge of the lock pin upon pressing such that the burrs may be located in the burr escape portion.

In a preferred embodiment of the invention, the burr escape portions are formed at two of four corners of the first slide hole corresponding to the burrs.

In accordance with the present invention, since the lock pin is comprised of an engagement pin section and a cam driven section which are formed integrally by a single member, the cam driven section functions as a slider in the prior art and can save such a slider which was necessary so far. Accordingly, the number of parts can be reduced and the assembling cork for the locking mechanism can be facilitated by so much.

Further, in accordance with the present invention, since the lock pin is pressed into a flat plate, the lock pin can be formed extremely easily compared with the lock pin formed by cutting.

Further, since the cam driven section integrated with the lock pin functions as the conventional slider, no slider as congenitally required is required, to thereby enable the number of parts to be reduced and facilitate the operation of assembling the lock mechanism by so much as the number of parts is reduced.

Particularly, in accordance with the present invention since burr escape portions are defined at corners of the first slide hole corresponding to burrs formed on the outer peripheral edge of the engagement pin section upon pressing such that the burrs may be located at the burr escape portions, the engagement pin section can be guided smoothly through the first slide hole with burrs being located in the escape portions, and troublesome operation for removing burrs is no more necessary.

Also in the second aspect of the present invention, since the lock pin is formed by pressing into a plate-shaped member, and burr escape portions are defined at corners of the first slide hole corresponding to burrs formed on the outer peripheral edge of the lock pin upon pressing such that the burrs ray be located in the burr escape portions, the lock pin can be guided smoothly through the first slide hole with burrs being located in the escape portions, and troublesome operation for removing burrs is no more necessary.

In accordance with the third aspect of the present invention, since the lock pin is comprised of an engagement pin section and a cam driven section which are formed integrally by a single member, the cam driven section functions as a slider in the prior art and can save such a slider which was necessary so far. Accordingly, the number of parts can be reduced and the assembling work for the locking mechanism can be facilitated by so much.

Furthermore, in a preferred embodiment of the present invention, since the lock pin is pressed into a flat plate, the lock pin can be formed extremely easily compared with the lock pin formed by cutting.

According to the above constitution, since the cam driven section integrated with the lock pin functions as the conventional slider, no slider as conventionally required is required, to thereby enable the number of parts to be reduced and facilitate the operation of assembling the lock mechanism by so much as the number of parts is reduced.

BRIEF DESCRIPTION OF THE DRAWINGS

The above and other objects and features of the present invention will be more apparent from the following description taken in conjunction with the accompanying drawings, wherein.

DETAILED DESCRIPTION OF THE PREFERRED EMBODIMENTS

Now, descriptions will be given in more details to a preferred embodiment of the present invention with reference to FIGS. 1 to 9.

Figure 1:
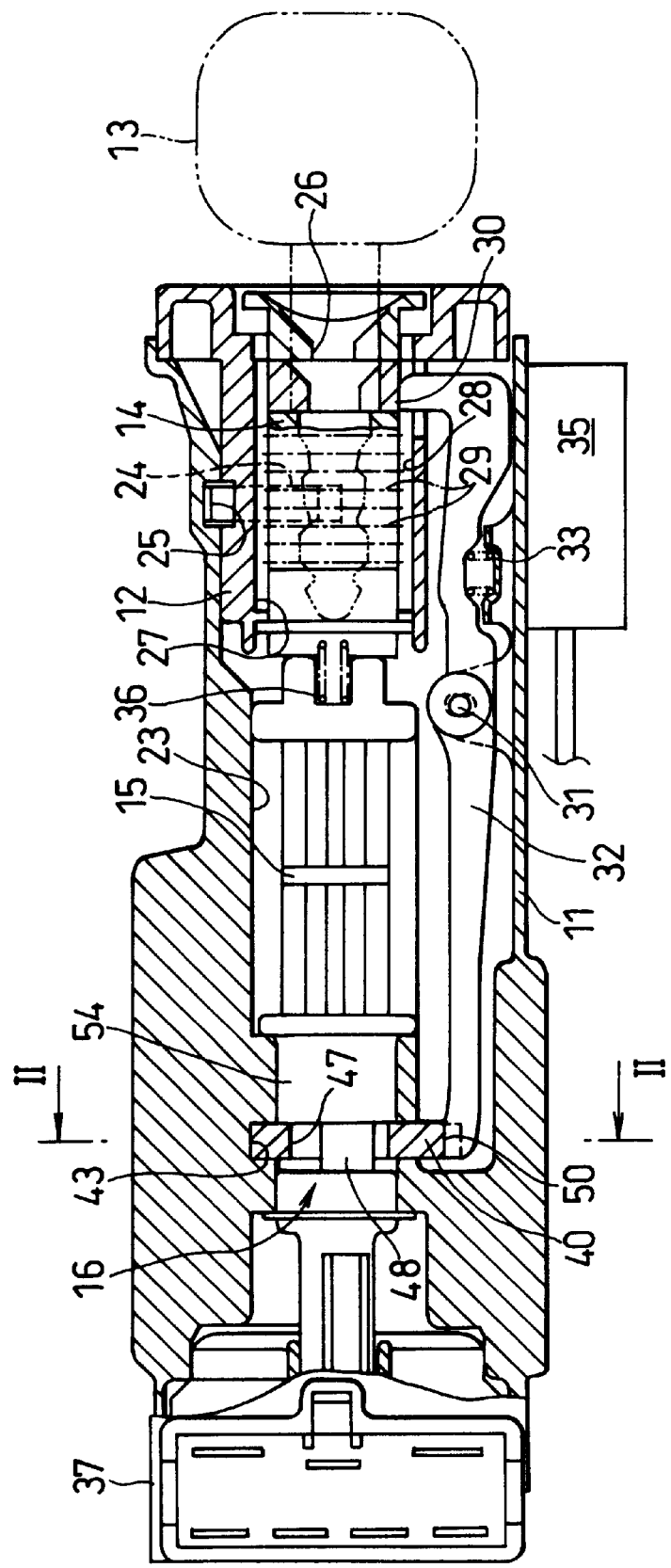
FIG. 1 is a vertically cross-sectional view showing a steering lock device of an embodiment according to the present invention.
Figure 2:
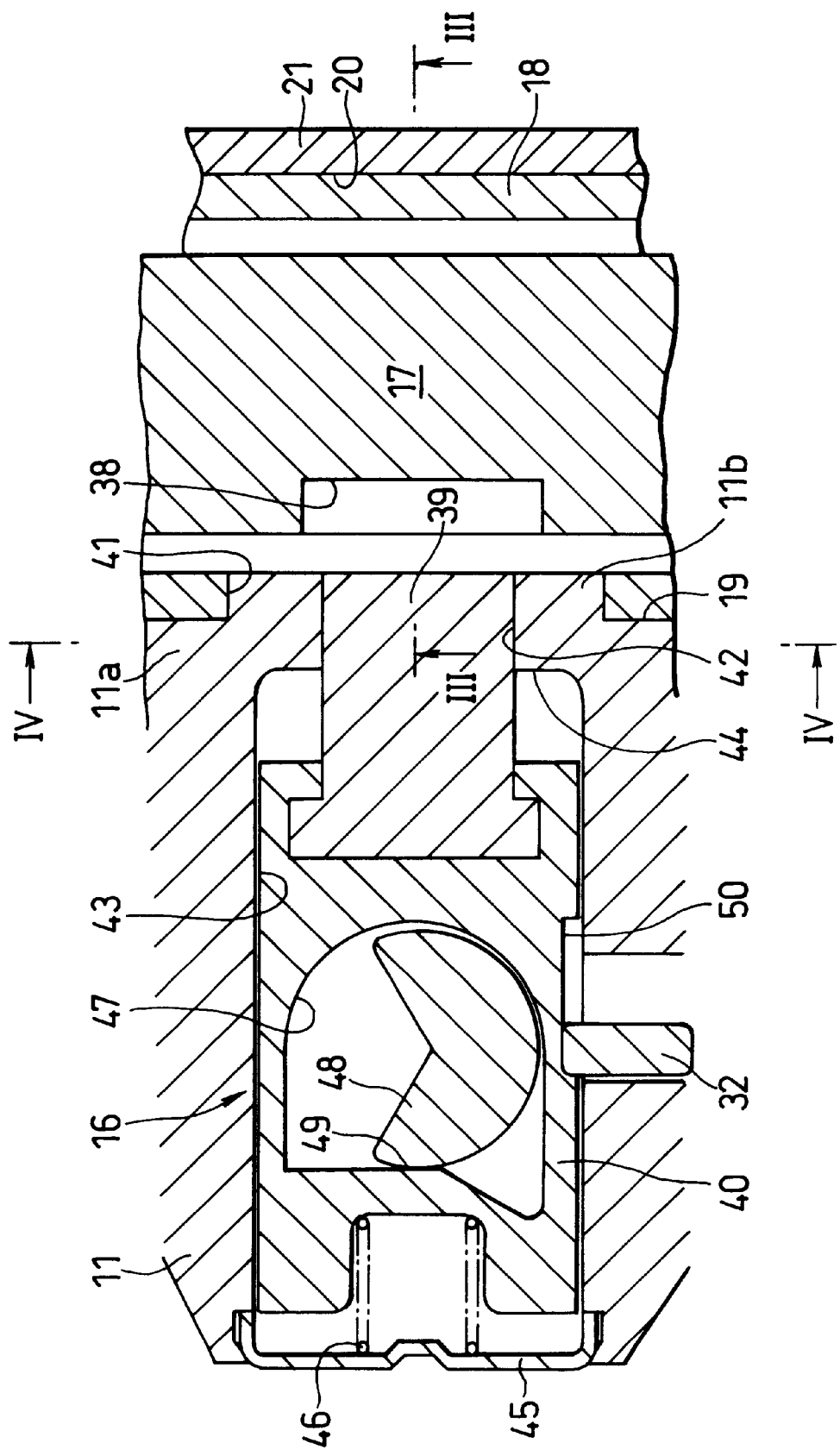
FIG. 2 is an enlarged cross-sectional view taken along a line II—II of FIG. 1.
Figure 3:
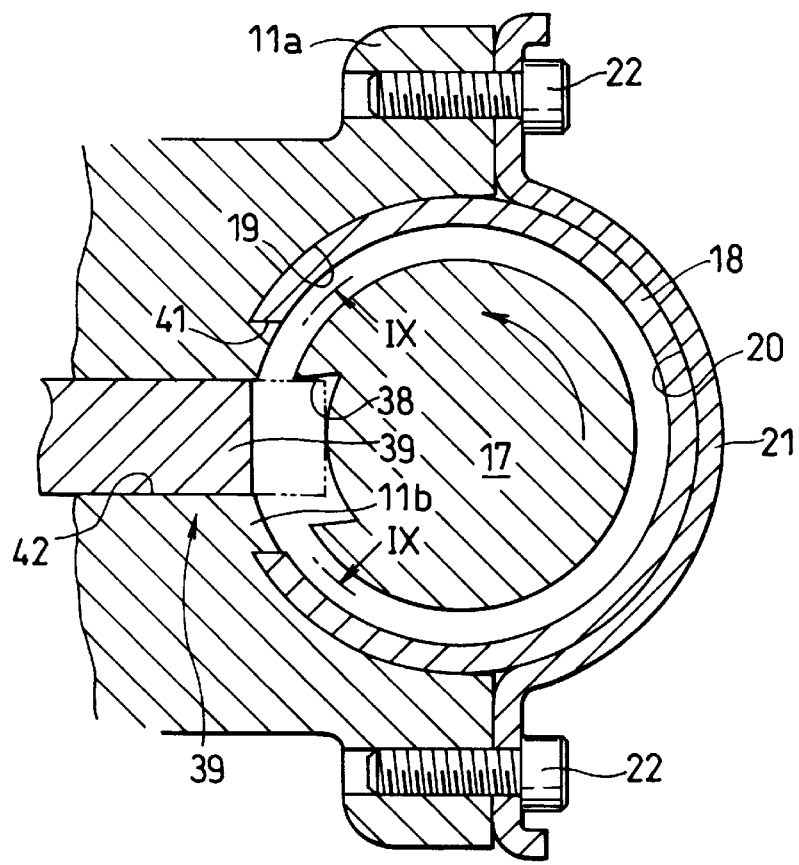
FIG. 3 is a cross-sectional view taken along a line III—III of FIG 2.
Figure 4:
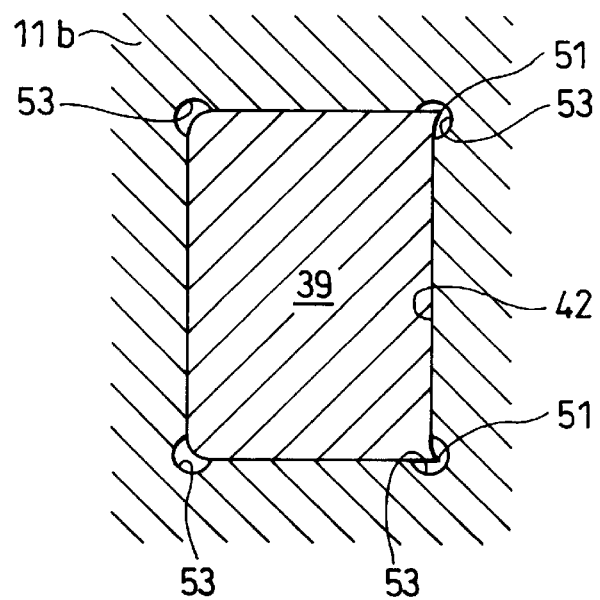
FIG. 4 is an enlarged cross-sectional view taken along a line IV—IV of FIG. 2.
Figure 5:
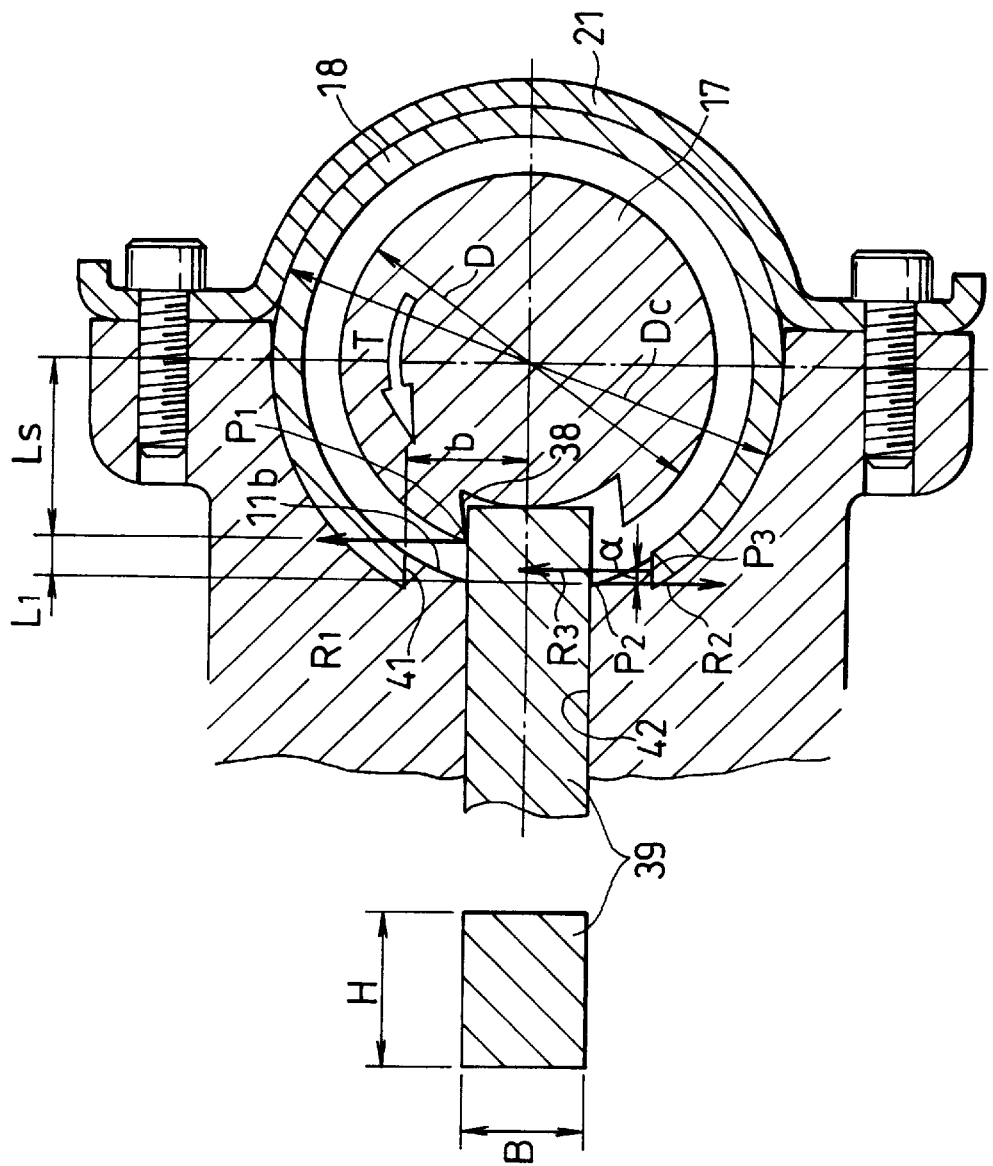
FIG. 5 is a simplified view corresponding to FIG. 3 for explanation of a relation between a stress and dimensions.
Figure 6:
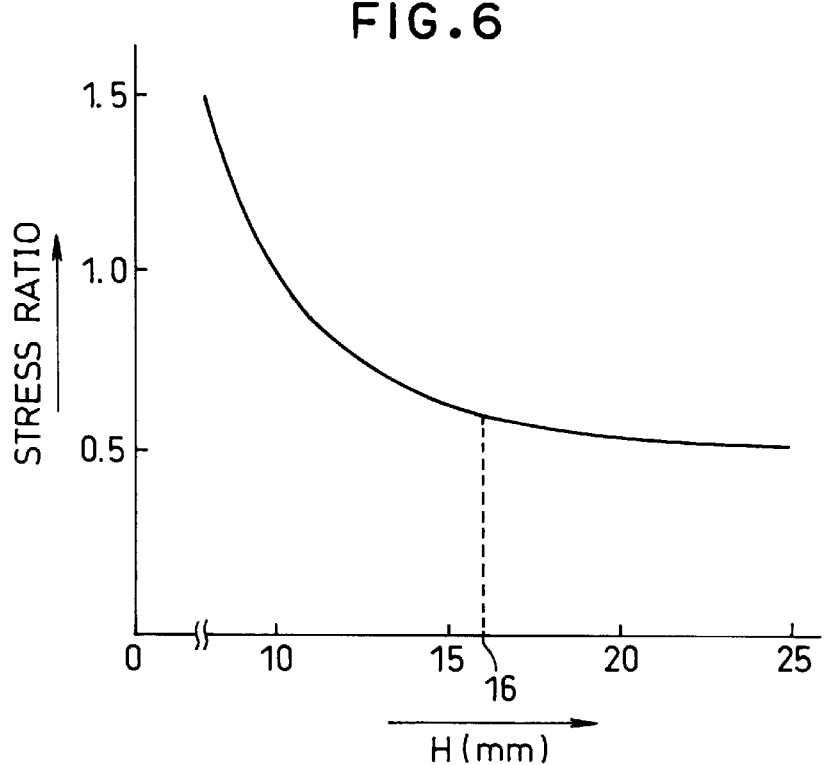
FIG. 6 is a graph showing a stress ratio in accordance with the dimensions of a lock pin along an axial direction of a steering shaft.
Figure 7:
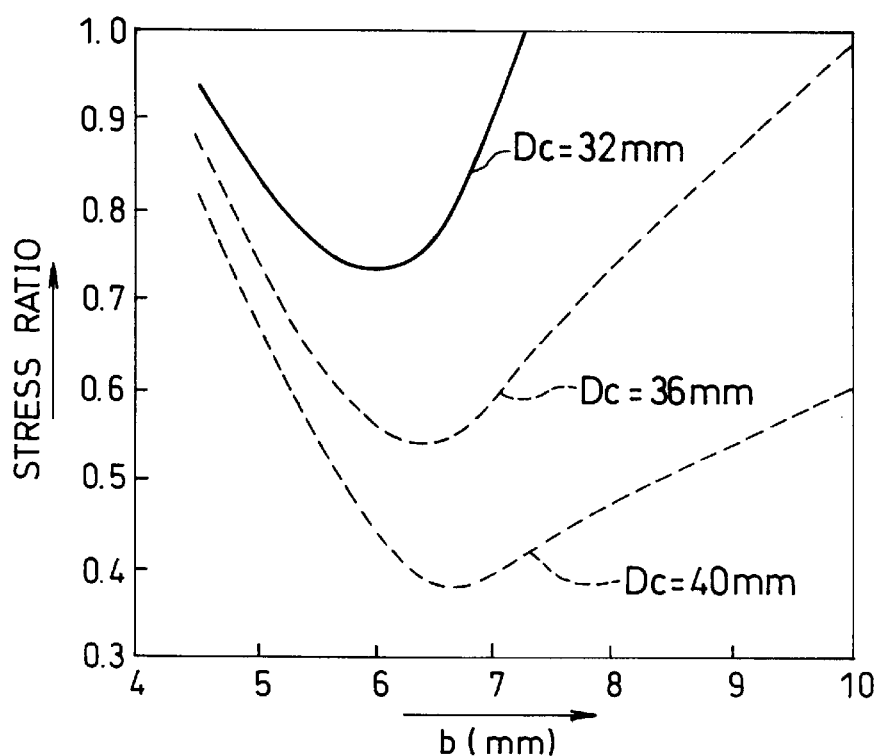
FIG. 7 is a graph showing a stress ratio of a guide projection in accordance with a distance from the center of the lock pin on a plane orthogonal to the axial line of the steering shaft to a side surface of an insertion hole.
Figure 8:
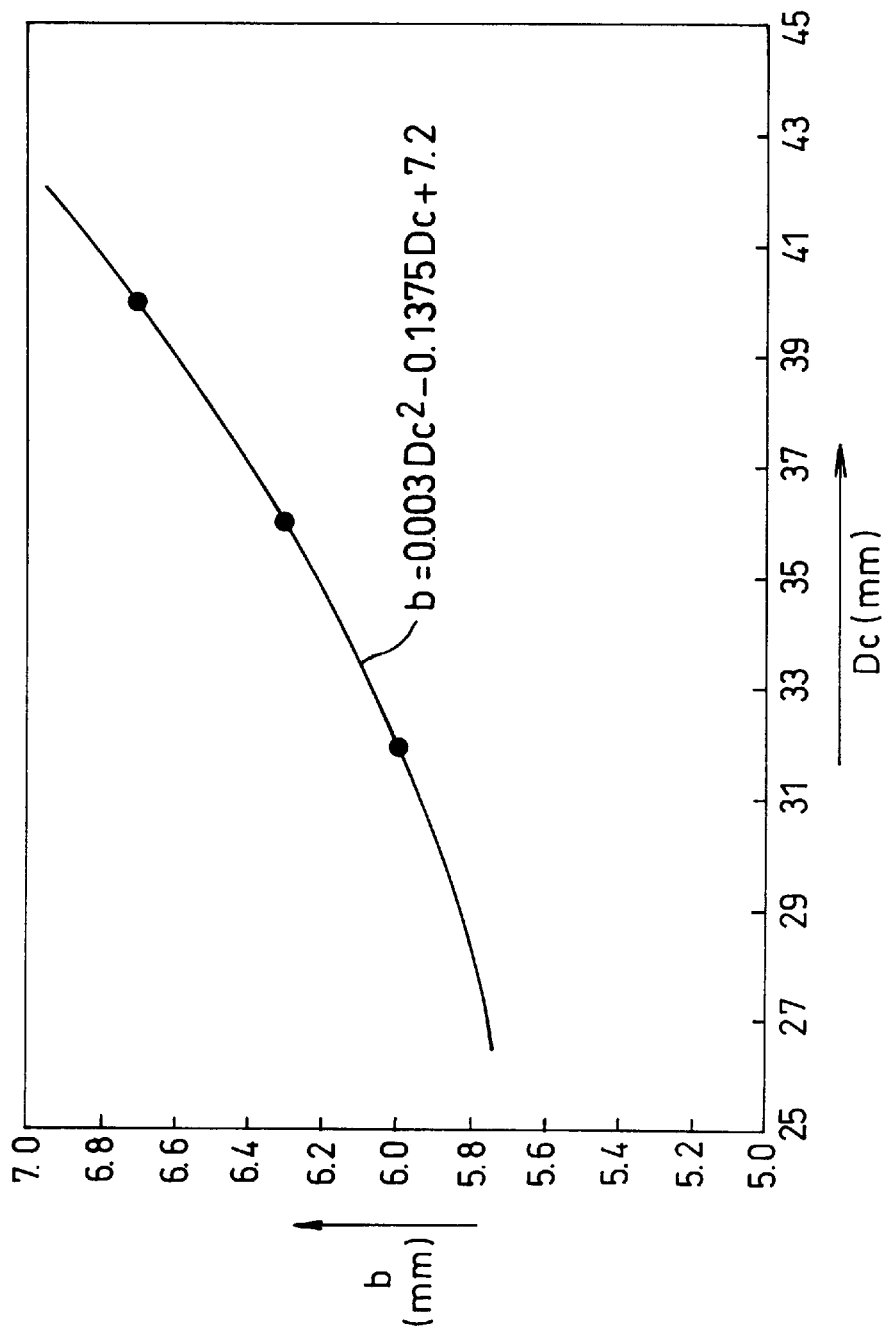
FIG. 8 is a graph showing the distance from the center of a lock pin on a plane orthogonal to the axial line of the steering shaft to a side surface of an insertion hole being determined in accordance with the diameter of a steering column pipe.
Figure 9:
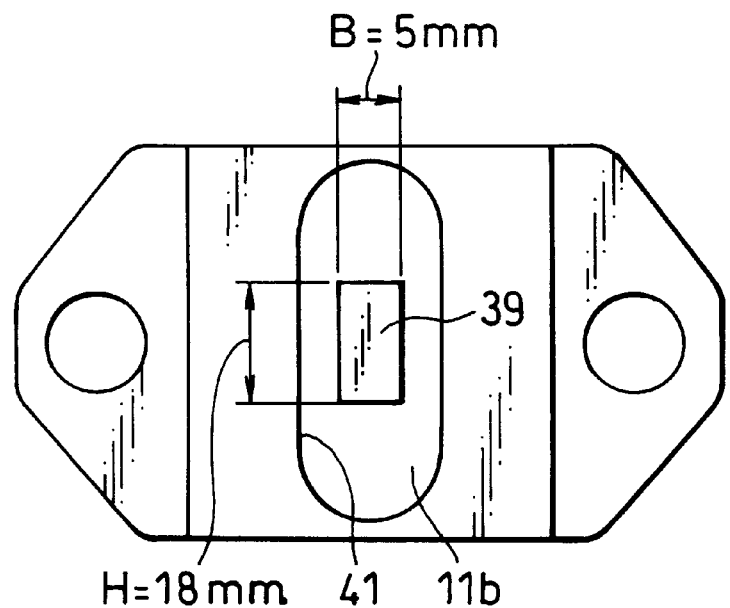
FIG. 9 is a view taken along a line IX—IX of FIG. 3.

FIGS. 1 to 9 show an embodiment of the present invention. FIG. 1 is a vertically cross-sectional view of a steering lock device of one embodiment according to the present invention; FIG. 2 is an enlarged cross-sectional view taken along a line II—II of FIG. 1; FIG. 3 is a cross-sectional view taken along a line III—III of FIG. 2; FIG. 4 is an enlarged cross-sectional view taken along a line IV—IV of FIG. 2; FIG. 5 is a simplified view corresponding to FIG. 3 for explanation of a relation between a stress and dimensions; FIG. 6 is a graph showing a stress ratio in accordance with the dimensions of a lock pin along an axial direction of a steering shaft; FIG. 7 is a graph showing a stress ratio of a guide projection in accordance with a distance from the center of the lock pin on a plane orthogonal to the axial line of the steering shaft to a side surface of an insertion hole; FIG. 8 is a graph showing the distance from the center of the lock pin on a plane orthogonal to the axial line of the steering shaft to a side surface of an insertion hole being determined in accordance with the diameter of a steering column pipe; and FIG. 9 is a cross-sectional view taken along a line IX—IX of FIG. 3.

First, in FIG. 1, a steering lock device according to this embodiment includes a housing 11, a cylinder body 12 fixedly attached to the housing 11, a rotor 14 rotatable by an inserted key 13 and inserted into the cylinder body 12, a joint 15 engaged with the rotor 14 in a relatively non-rotatable manner, disposed coaxially on a rear side of the rotor 14, and rotatably supported by the housing 11, and a lock mechanism 16 that enables a lock state where the rotation of a steering shaft 17 (refer to FIGS. 2 and 3) is obstructed and a lock release state where the rotation of the steering shaft 17 to be switched in accordance with the rotation of the rotor 14 and the joint 15.

Referring to FIG. 2 and FIG. 3 together, the steering shaft 17 is coaxially surrounded by a fixed steering column pipe 18. A mounting face 19 cross-sectionally shaped in an arc which is in contact with an outer periphery of the steering column pipe 18 is disposed on a mounting portion 11a integral with the housing 11. Also, a column holder 21 having a mounting face 20 cross-sectionally shaped in an arc which is in contact with the outer circumference of the steering column pipe 18 is clamped to the mounting portion 11a with a pair of bolts 22 on a side opposite to the mounting face 19. In other words, the housing 11 is fitted to the steering column pipe 18.

Again referring to FIG. 1, the cylinder body 12 is so designed as to be inserted into a front half portion of a containment 23 defined in the housing 11, and an elastic engagement member 24 mounted on an outer periphery of the cylinder body 12 is elastically engaged with an engagement groove 25 defined in an inner surface of the containment hole 23, to thereby obstruct the axial movement of the cylinder body 12 within the containment hole 23.

The rotor 14 has a key hole 26 a front end of which is opened and is shaped in a bar which is circular in a transversal cross-section. The rotor 14 is rotatable and movable in a limited range along the axial direction, and inserted into a cylinder hole 27 of the cylinder body 12. A plurality of grooves 28 extending along the axial direction of the cylinder hole 27 are disposed at a plurality of portions of the inner surface of the cylinder 27 each at a circumferential interval, and a plurality of tumblers 29 elastically urged toward a direction along which they are engaged with those grooves 28 are fitted in the rotor 14. With this structure, the respective tumblers 29 are engaged with the grooves 28 so as to obstruct the rotation of the rotor 14 when the key 13 is not inserted into the key hole 26, but are moved apart from the grooves 28 in accordance with the insertion of the key 13 into the key hole 26 to slide to a position where the rotation of the rotor 14 is permitted.

A front end portion of the rotor 14 is equipped with a key slider 30 which is slidable along a diametrical direction of the rotor 14 in accordance with the insertion of the key 13 into the rotor 14 and the extraction of the key 13 from the rotor 14. A lower end of the key slider 30 abuts against a front end of an operating lever 32 supported by the housing 11 through a support shaft 31. Between the operating lever 32 and the housing 11 is provided a spring 33 that exhibits a spring force in a direction of pressing the key slider 30 by a front end of the operating lever 32. When the key 13 is extracted from the key hole 26, to situate the rotor 14 at a LOCK position, the key slider 30 is pressed up to a position where the upper end of the key slider 30 is projected from an outer circumferential surface of the rotor 14. When the key 13 is inserted into the key hole 26 and the key slider 30, as shown in FIG. 1, the key slider 30 is moved to a position where the outer circumferential surface of the key slider 30 is made identical with the outer circumferential surface of the rotor 14 against an elastic force exerted from the operating lever 32. Then, when the rotor 14 rotates in that state, the front end of the operating lever 32 comes into sliding contact with the outer circumferential surface of the key slider 30. Also, a key detection switch 35 that conducts detection operation in accordance with the operation of the operating lever 32 is equipped in the housing 11, for detection of the insertion of the key 13 into the rotor 14.

At a rear side of the rotor 14, the joint 15 is supported by the housing 11 such that the joint 15 can not move along its axial direction and can rotate about the axial line, and the front end portion of the joint 15 is engaged with the rear end of the rotor 14 so as not to be relatively rotatable. In other words, the joint 15 rotates together with the rotor 14. A spring 36 is disposed between the joint 15 and the rotor 14, and the rotor 14 is urged forwardly by a spring force of the spring 36.

At a rear end of the housing 11, is attached an ignition switch 37, and the rear end portion of the joint 15 is coupled to the ignition switch 37.

As shown in FIGS. 2 and 3, the Lock mechanism 16 can switch a lock state where it is engaged with the engagement recess 38 disposed on the outer circumference of the steering shaft 17 to obstruct the rotation of the steering shaft 17 and a lock release state where the engagement with the engagement recess 38 is released to enable the rotation of the steering shaft 17. The lock mechanism 16 includes a lock pin 39 which is slidable in a direction of switching engagement and the release of engagement with and from the engagement recess 38 and supported by the housing 11, and a slider 40 which is engaged and joined with the lock pin 39 and supported slidably by the housing 11.

As shown in FIG. 3, the mounting portion 11a of the housing 11 has a guide projection 11b integrally projected from the mounting face 19 at a position corresponding to the engagement recess 38 along the axial direction of the steering shaft 17, and the guide projection 11b is engaged with an insertion hole 41 defined in the steering column pipe 18. A top end surface of the guide projection 11b is laterally cross-sectionally shaped in an arc so as to be flat in contiguous with the inner surface of the steering column pipe 18. The guide projection 11b is so designed as to effectively ensure a flexural strength of the lock pin 39 in the lock state so that locking is not released improperly by turning the steering shaft 17 by an excessive force when the lock mechanism 16 is in the lock state.

Further referring to FIGS. 2 and 3 together, in the housing 11, a first slide hole 42 one end of which is opened at the top end of the guide projection 11b and a second slide hole 43 enlarged more than the first slide hole 42 and continuous to the other end of the first slide hole 42 are provided so as to form a step 44 between the first and second slide holes 42 and 43. Between a cap 45 attached to the housing 11 so as to close the other end of the second slide hole 43 and the lock pin 39, there is provided a spring 46 that exhibits a spring force in a direction along which the lock pin 39 is engaged with the engagement recess 38.

The lock pin 39 has a square transversal cross-sectional shape having a first side along the axial line of the steering shaft 17 and a second side orthogonal to the first side, and is engageable with the engagement recess 38 of the steering shaft 17 and slidably inserted into the first slide hole 42. The slider 40 is engaged and joined with the lock pin 39. As shown in FIGS. 1 and 2, the slider 40 is provided with a through-hole 47 for passing through the joint 15, and an abutment surface 49 capable of abutting against a cam 48 provided in the joint 15 is formed on an inner surface of the through-hole 47.

The lock pin 39 is made, for example, of carbon steel for mechanical structure such as JIS S45C, and formed into a flat plate by pressing. The Rockwell hardness of the lock pin 39 is set to, for example, 40 (HRC) or more by conducting a hardening process or the like after pressing. On the other hand, the housing 11 is made, for example, of zinc alloy die-cast or magnesium alloy die-cast, and the steering column pipe 18 is formed, for example, of a steel pipe.

In the thus constituted lock mechanism 16, when the rotor 14 is at a position other than the LOCK position, that is, an ACC position, an ON position or a START position, the lock pin 39 is disengaged from the engagement recess 38 to allow the rotation of the steering shaft 17. On the contrary, when the rotor 14 is at a LOCK position, the cam 48 is rotated such that the lock pin 39 is moved to be engaged with the engagement recess 38 by the force of the spring 46. On the other hand, with the movement of the key slider 30 in accordance with the insertion of the key 13 into the key hole 26 of the rotor 14, the operating lever 32 is rotated in a direction along which the rear end of the lever 32 is made to approach the lock pin 39. On the outer circumferential surface of the slider 40, there is provided a regulation recess 50 for holding the lock release state of the lock mechanism 16 by engaging the rear end of the operating lever 32 when the lock mechanism 16 takes the lock release state in accordance with a position of the rotor 14 other than the LOCK position. That is, even when the rotor 14 is at the LOCK position, the lock mechanism 16 does not take the lock state by extracting the key 13 from the key hole 26 unless the operating lever 32 rotates in a direction of disengaging the rear end from the regulation recess 50.

By the way, as shown in FIG. 4, burrs 51 are inevitably formed on the outer peripheral edges of the lock pin 39 (and the peripheral edge of the through-hole 47) after the completion of pressing for the lock pin 39. It is, however, desirable that the work for removing the burrs 51 be avoided because this leads to an increase in the number of working operations, and in order to slidably support the lock pin 39 while having the burrs 51 by the housing 11, four corners of the first slide hole 42 are formed with escape portions 53, 53—which are substantially circular in a transversal cross section and expanded toward the outside, respectively. With this constitution, the burr 51 is designed to be located at two of the four escape portions 53, 53—so that the lock pin 39 can be freely guided by the first slide hole 42.

Since the lock pin 39 is pressed into a plate, the lock pin 39 can be formed extremely easily in comparison with the case of forming the lock pin 39 by cutting.

The lock pin 39 is required to have a flexural strength that withstands a bending load exerted from the steering shaft 17 in the engagement state with the engagement recess 38. However, if the flexural strength of the lock pin 39 is made excessively large the strength of the contact portion between the guide projection 11b provided in the housing 11 and the insertion hole 41 provided in the steering column pipe 18 into which the guide projection 11b is inserted becomes relatively lower than the above flexural strength and, as a result of which, the insertion contact portion of the guide projection 11b and the insertion hole 41 is deformed before the lock pin 39 is deformed.

The flexural strength of the lock pin 39 and the strength of the insertion contact portion between the guide projection 11b and the insertion hole 41 are balanced with each other, whereby the strength at break of the lock mechanism 16 can be improved. A way of determining the cross-sectional dimensions of the lock pin 39 to keep such a strength balance will be described below.

In FIG. 5, it is assumed that a length of a first side in the transversal cross-section of the lock pin 39 along the axial direction of the steering shaft 17 is H, the length of a second side orthogonal to the first side in the transversal cross-section, that is, the thickness of the lock pin 39 is B, the diameter of the steering shaft 17 is D, the torque of the steering shaft 17 is T, a length from the opening edge of the first slide hole 42 to a contact point $P_1$ between the edge of the engagement recess 38 and the lock pin 39 is L1 a length from the contact point $P_1$ a center of the steering shaft 17 along the longitudinal direction of the lock pin 39 is $L_S$, and a load reaction from the lock pin 39 to the steering shaft 17 at the contact point $P_1$ is $R_1$.

In this example, when a stress of the contact portion between the guide projection 11b of the housing 11 and the insertion hole 41 of the steering column pipe 18 is calculated, with the length H of the lock pin 39 being as a parameter by the finite element method, the result shown in FIG. 6 could be obtained. As is apparent from FIG. 6, the stress is reduced more as the length H increases. At H=16 mm, the above stress is converged to substantially a lower limit level. As a result, if H≧16 mm, the stress of the contact portion of the guide projection 11b and the insertion hole 41 can be suppressed to substantially the lower limit level. Thus it is required to safety the relation: H≧16 mm.

On the other hand, the bending stress σ exerted on the lock pin 39 can be expressed by the following relation (1):

$$\sigma = M/Z \quad (1)$$

where M is a bending moment, Z is a modulus of section of the lock pin 39 and $$M = R_1 \cdot L_L \quad (2)$$

$$Z = (H \cdot B^2)/6 \quad (3)$$

In view of the balance of the torque in the steering shaft 17, $$T = L_S \cdot R_1 \quad (4)$$

From the relations (2) and (4) can be written as:

$$M = (L_L/L_S) \cdot T \quad (5)$$

If the relations (3) and (5) are substituted for the relation (1), the following relation (6) can be obtained.

$$\sigma = 6 \cdot (L_L/L_S) \cdot T(H \cdot B^2) \quad (6)$$

By the way, the present inventors have proved through experiment that when the diameter D of the steering shaft 17 is 29 mm, a sufficient flexural strength necessary for the lock pin 39 can be obtained if B=5 mm and H=18 mm. The bending stress $\sigma_O$ of the lock pin 39 to an arbitrary load torque can be represented as follows.

$$\sigma_O = 6 \cdot (L_{LO}/L_{SO}) \cdot T(18 \cdot 5^2) = (1/75) \cdot (L_{LO}/L_{SO}) \cdot T \quad (7)$$

The arbitrary values of B and H are required to satisfy: $\sigma \leq \sigma_O$, and from the relations (6) and (7), the following relation is obtained.

$$6 \cdot (L_L/L_S) \cdot T(H \cdot B^2) \quad ((1/75) \cdot (L_{LO}/L_{SO}) \cdot T$$

That is, $$H \cdot B^2 \geq 450 \cdot (L_L/L_{LO}) \cdot (L_{SO}/L_S) \quad (8)$$

Here, if $L_L$ is made constant, $$L_L/L_{LO} = 1 \quad (9)$$

Since $L_S$ is substantially proportional to the diameter D of the steering shaft 17, $$L_{SO}/L_S = 29/D \quad (10)$$

If the relations (10) and (9) are substituted for the relation (8), $$H \cdot B^2 \geq (450 \times 29)/D \quad (11)$$

and $$B \geq (13050/(D \cdot H))^{1/2} \quad (12)$$

Further, the lock pin 39 is pressed, and since the upper limit value of the plate thickness that can be mass-produced by pressing is about 6 mm, the range of the above mentioned length B must be finally set as follows.

$$6 \geq B \geq (13050/(D \cdot H))^{1/2} \quad (13)$$

Referring again to FIG. 5, as the torque of the steering shaft 17 exerts on the lock pin 39 in the engagement state of the lock pin 39 with the engagement recess 38, the bending load $R_2$ exerts on the guide projection 11b of the housing 11 from the lock pin 39 at the contact position $P_2$ with the opening edge of the first slide hole 42, and also the reaction $R_3$ exerts thereon along the direction of the plate thickness of the steering column pipe 18 from the contact portion between the insertion hole 41 and the guide projection 11b. If a concentrated load at the center position $P_3$ of the contact portion is set as reaction $R_3$ for the sake of convenience, a shearing or bending force is liable to occur locally in the guide projection 11b as an offset amount for both the positions $P_2$ and $P_3$ on a plane orthogonal to the axial line of the steering shaft 17 increases, resulting in a disadvantage from the strength viewpoint. On the other hand, when the offset amount is too small, the thickness of the guide projection 11b is thinned, resulting in a disadvantage from the strength viewpoint. Therefore, it is required to appropriately determine the offset amount in accordance with the diameter Dc of the steering column pipe 18 for maintaining the strength of the guide projection 11b. In this case, if an appropriate value of the offset amount can be set automatically in accordance with the diameter $D_c$ of the steering column pipe 18 it will contribute to the rationalization of productivity. For such a purpose, a manner of setting the offset amount α will be described below.

Since the guide projection 11b is inserted into the insertion hole 41 provided in the steering column pipe 18 which is circular in transversal cross section, the offset amount α is varied in accordance with a distance b from the center of the lock pin 39 within a plane orthogonal to the axial line of the steering shaft 17 to the outer surface of the guide projection 11b, that is, the inner surface of the insertion hole 41, the offset amount α can be determined to an appropriate value by appropriately determining the distance b in accordance with the diameter Dc of the steering column pipe 18.

Three steering column pipes 18 having diameter $D_c$ of 32 mm, 36 mm and 40 mm, respectively, was provided, and when the maximum value of a stress exerted on the guide projection 11b was calculated while changing the distance b under the condition of 3 mm<B<10 mm, the results shown in FIG. 8 could be obtained. According to FIG. 8, it is understood that when the diameter Dc is 32 mm, the stress reaches minimum at b=6 mm, when the diameter Dc is 36 mm, the stress reaches minimum at b=6.3 mm, and when the diameter Dc is 40 mm, the stress reaches minimum at b=6.7 mm.

In the three types of steering column pipes 18, having diameters $D_c$ of 32 mm, 36 mm and 40 mm, respectively, when the distance b at which the stress of the guide projection 11b reaches minimum is plotted on a coordinate in which the abscissa represents the diameter Dc of the steering column pipe 18 and ordinates represents the distance b, the results shown in FIG. 7 are obtained. A curve formed by connecting the respective plot points is a curve of the second order represented by the following relation.

$$b=0.0031\ D_c^2 - 0.1375\ D_c + 7.2 \quad (14)$$

That is, if the distance b existing on the curve of the second order is selected, the stress exerted on the guide projection 11b can be minimized and the strength of the guide projection 11b can be appropriately set. A margin of 0.5 mm is provided on each of the plus side and the minus side, respectively. Then, the above relation (14) is replaced by the following relation:

$$f(D_c)=0.0031\ D_c^2 - 0.1375\ D_c + 7.2 \quad (15)$$

and the distance b is set so that it is within the range satisfying the relation:

$$f(D_c) - 0.5 \leq b \leq f(D_c) + 0.5 \quad (16)$$

Namely, in order to balance the flexural strength of the lock pin 39 with the strength of the insertion contact portion of the guide projection 11b and the insertion hole 41, the length H for the first side of the lock pin 39 along the axial line of the steering shaft 17 and the length B for the second side of the lock pin 39 along the circumferential direction of the steering shaft 17 are determined as follows.

$$H \geq 16\ mm$$

$$6 \geq B \geq (13050/(D \cdot H))^{1/2}$$

Figure 10:
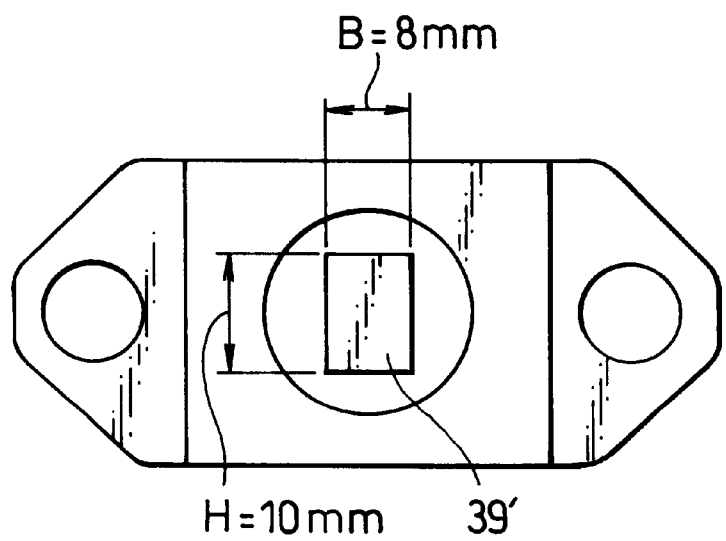
FIG. 10 is a view showing a prior art corresponding to FIG. 9.

Accordingly, as shown in FIG. 9, the cross-sectional profile of the lock pin 39 is a rectangle elongated along the axial line of the steering shaft 17. When the diameter D of the steering shaft 17 is 29 mm, for example, H=18 mm and B=5 mm. When the lock pin 39 has such a cross-sectional profile, the flexural strength of the lock pin 39 and the strength of the insertion contact portion between the guide projection 11b and the insertion hole 41 are balanced, thereby enabling to improve the strength at break of the lock mechanism 16. On the contrary, in the cross-sectional profile of a conventional engagement pin 39' as shown in FIG. 10, when the diameter D of the steering shaft 17 is 29 mm, H=10 mm and B=8 mm for instance. In comparison with the lock mechanism having the engagement pin 391 of the above-mentioned cross-sectional profile, the lock mechanism 16 having the lock pin 39 of the cross-sectional profile shown in FIG. 10 can increase the strength by 50% or more.

Further, when the distance b from the center of the lock pin 39 within a plane orthogonal to the axial line of the steering shaft 17 to the outer surface of the guide projection 11b, that is, the inner surface of the insertion hole 41 is determined in accordance with the relation (16), the distance b that enables to set the strength of the guide projection 11b to the maximum while minimizing the stress exerted on the guide projection 11b is made uniform in accordance with the diameter Dc of the steering column pipe 18, whereby the configuration of the insertion hole 41 in the steering column pipe 18 can be made constant regardless of the specification of the steering lock device to enable rationalization of productivity. In this case, the cross-sectional profile of the guide projection 11b is desirably an elongate circular shape as shown in FIG. 9.

Figure 11:
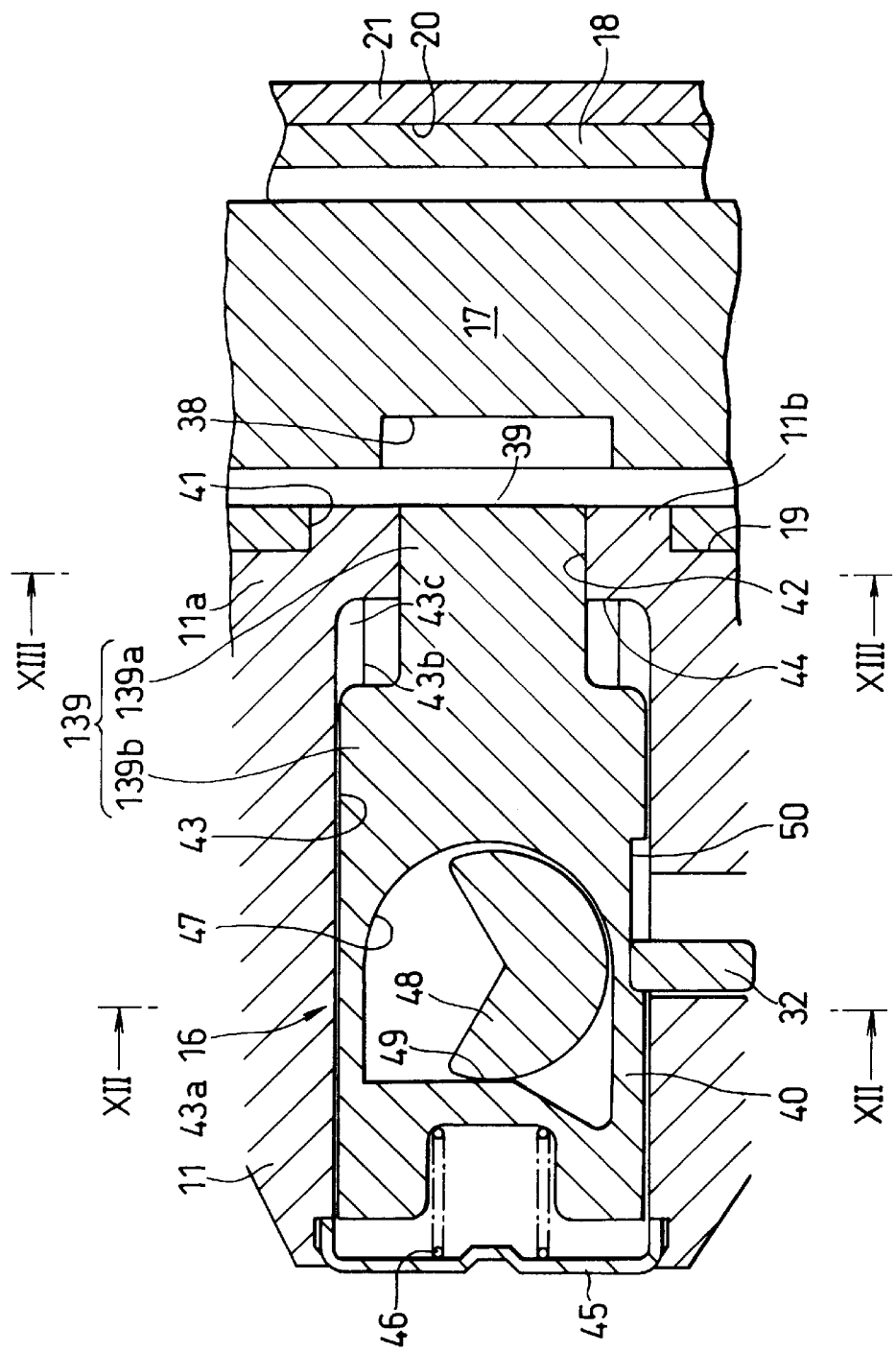
FIG. 11 is a view, corresponding to FIG. 2, showing a steering lock device of another embodiment according to the present invention.
Figure 12:
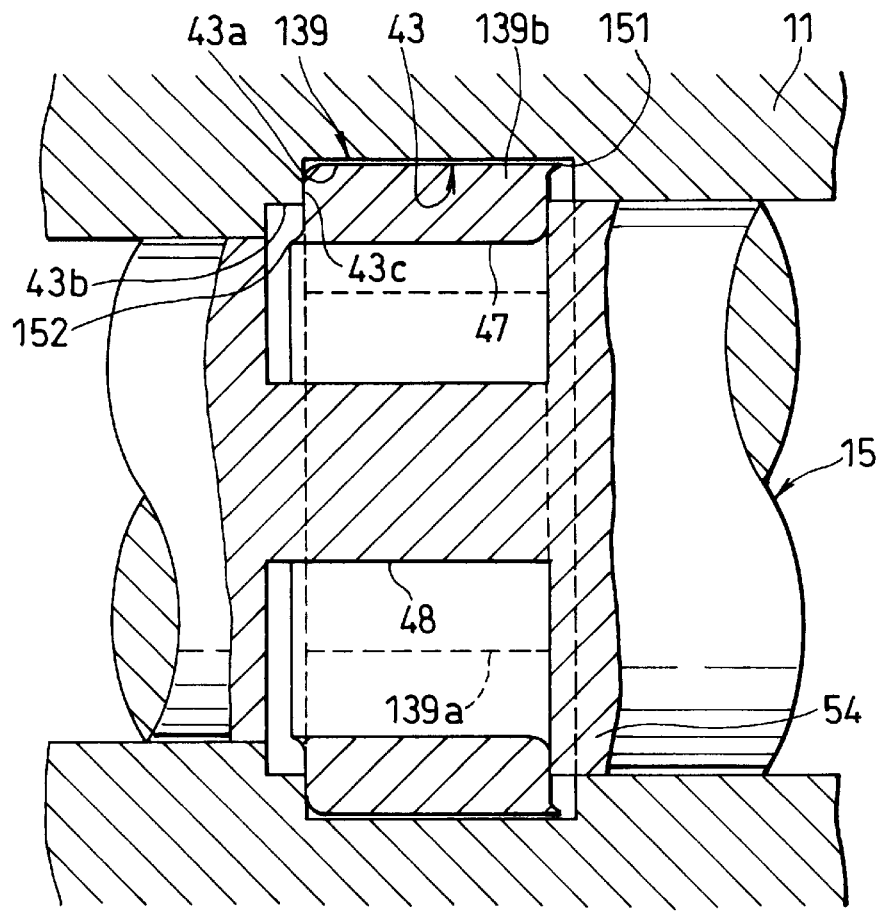
FIG. 12 is an enlarged cross-sectional view taken along a line XII—XII of FIG. 11.
Figure 13:
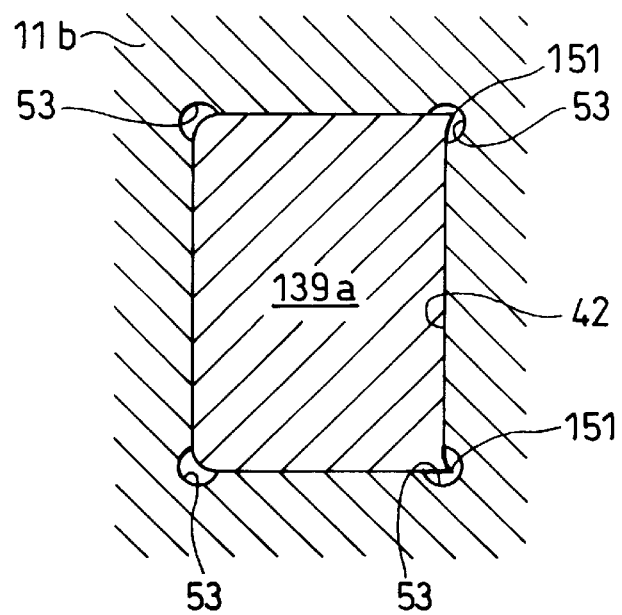
FIG. 13 is an enlarged cross-sectional view taken along line XIII—XIII of FIG. 11.

FIGS. 11 to 13 show another embodiment of the present invention, in which the lock pin 39 and the slider 40 in the previous embodiment are replaced with a lock pin 139.

As shown in FIG. 11 to FIG. 13, the lock pin 139 comprise an engagement pin section 139a engageable with an engagement recess 38 and slidably inserted into a first slide hole 42, and a cam driven section 139b slidably inserted into a second slide hole 43, which are formed integrally without any joints, and is pressed in the form of a plate.

In the same manner as in the lock pin 39 of the previous embodiment, the lock pin 139 is made, for example, of carbon steel for mechanical structure such as JIS S45C. The Rockwell hardness of the lock pin 39 is set to, for example, 40 (HRC) or more by conducting a hardening process or the like after pressing. On the other hand, the housing 11 is made, for example, of zinc alloy die-cast or magnesium alloy die cast, and the steering column pipe 18 is formed, for example, of a steel pipe also in the same manner as in the previous embodiment.

A through hole 47 for passing through the joint 15 is provided in the cam driven section 139b of the lock pin 139 like that in the slider 40 of the previous embodiment, and an abutment surface 49 capable of abutting against the cam 48 disposed to the joint 15 is formed on the inner surface of the through hole 47.

By the way, as shown in FIGS. 12 and 13, burrs 151, 152 are inevitably formed on the outer peripheral edges of the lock pin 139 by pressing for the lock pin 139 and the peripheral edges of the through-hole 47 after the completion of pressing. It is, however, desirable that the operation of removing the burrs 151, 152, be avoided because this leads to an increase in the number of working operations, and in order to slidably support the lock pin 139 having the burrs 151, 152 by the housing 11, the direction of pressing the lock pin 139 and the structure of slidably supporting the lock pin 39 are set, for example, as follows:

That is, as shown in FIGS. 12 and 13, the lock pin 139 is pressed in such a manner that the burr 151 occurring on the outer peripheral edge and the burr 152 occurring on peripheral edge of the through-hole 47 are opposed to each other. On the other hand, the first slide hole 42 into which the engagement pin section 139a of the lock pin 139 is slidably inserted is shaped to be substantially square in a transversal cross section in correspondence with the cross sectional shape of the engagement pin section 139a. Like that in the previous embodiment, four corners of the first slide hole 42 are formed with escape portions 53, 53—each of which is substantially circular in transversal cross section and expanded toward the outside, respectively. With this constitution, the burrs 151 are designed to be located at two of the four escape portions 53, 53—so that the engagement pin section 139a can be slidably guided by the first slide hole 42.

Also, both of side surfaces of the second slide hole 43 into which the cam driven section 139b of the lock pin 139 is slidably inserted are formed to have first side surfaces 43a, 43a opposed to the outer surface of the cam driven section 139b, second side surfaces 43b, 43b arranged at the inner side of the second side surfaces 43a, 43a and steps 43c, 43c formed between the first and second side surfaces 43a and 43b, respectively. Further, the length of the first side surface 43a along the axial direction of the joint 15 is set to be larger than the thickness of the cam driven section 139b and the length of the second side surface 43b along the axial direction of the joint 15 is set to be larger than an assumed projection amount of the burr 152, and the inner peripheral edge of the steps 43c, 43c are arranged outward of the outer peripheral edge of the through-hole 47. Further, a regulation jaw 54 which is in contact with the entire surface of the cam driven section 139b at the peripheral edge of the through-hole 47 at a side where the burr 51 occurs is formed integrally with the joint 15, and the other surface of the cam driven section 139b at a side where the burr 52 occurs is received by the steps 43c of the second slide hole 43. As a result, it is possible to slidably guide the cam driven section 139b by the second slide hole 43 while preventing an interference of the burrs 51 and 52 with the housing 11.

In the lock mechanism 16 as described above, since the cam driven section 139b integrated with the lock pin 139 functions as the slider provided in the conventional lock mechanism, the slider as required in the previous embodiment is no more necessary, to thereby enable the number of parts to be reduced and facilitate the assembling operation for the lock mechanism 16 as the number of parts is reduced. In addition, since the lock pin 139 is pressed in the form of a plate, the lock pin 139 can be formed extremely readily in comparison with a lock pin formed conventionally by cutting.

The foregoing description of the preferred embodiments of the invention has been presented for purposes of illustration and description. It is not intended to limit the invention to the precise form disclosed, and modifications and variations are possible in the light of the above teachings or may be acquired from practice of the invention. It is intended that the scope of the invention be defined by the claims appended hereto, and their equivalents.

What is claimed is:

1. A steering lock device including:
   a fixed housing,
   a cylinder body mounted to the housing,
   a rotor disposed in the cylinder body and made rotatable by an inserted key,
   a steering shaft having an engagement recess defined in a portion of a circumferential surface,
   a lock pin slidably supported in the housing and engageable at the top end with the engagement recess, and
   a lock mechanism actuated in accordance with the rotation of the rotor to conduct engagement and release of engagement of the lock pin with and from the engagement recess, wherein
   the lock pin comprises an engagement pin section that slides being guided by a first slide hole in the housing and engageable at a top end with the engagement recess and a cam driven section that slides being guided by a second slide hole in the housing and actuated by an operation force of the locking mechanism by way of a cam, wherein
   the engagement pin section and the cam driven section are formed integrally by pressing into a plate-shaped member, and wherein
   burr shaped escape portions are defined at corners of the first slide hole corresponding to burrs formed on the outer peripheral edge of the engagement pin section upon pressing such that the burrs may be located in the burr escape portions.

2. The steering lock device as claimed in claim 1, wherein the burr escape portions are formed at four corners of the first slide hole corresponding to the burrs.

3. A steering lock device including:
   a fixed housing,
   a cylinder body mounted to the housing,
   a rotor disposed in the cylinder body and made rotatable by an inserted key,
   a steering shaft having an engagement recess defined in a portion of a circumferential surface,
   a lock pin body slidably supported in the housing and engageable at the top end with the engagement recess, and
   a lock mechanism actuated in accordance with the rotation of the rotor to conduct engagement and release of engagement of the lock pin body with and from the engagement recess, wherein the lock pin body comprises a lock pin that slides being guided by a first slide hole in the housing and engageable at a top end with the engagement recess and a slider that slides being guided by a second slide hole in the housing and actuated by an operation force of the lock mechanism by way of a cam, wherein
   the lock pin is formed by pressing into a plate shaped member, and wherein
   burr escape portions are defined at corners of the first slide hole corresponding to burrs formed on the outer peripheral edge of the lock pin upon pressing such that the burrs may be located in the burr escape portions.

4. A steering lock device as defined in claim 3, wherein the burr escape portions are formed at two of four corners of the first slide hole corresponding to the burrs.

* * * * *